(12) United States Patent
Jones et al.

(10) Patent No.: US 6,386,054 B1
(45) Date of Patent: May 14, 2002

(54) MANIKIN ASSEMBLY AND METHOD FOR THE TESTING OF SEATS WHICH UTILIZES THE ASSEMBLY

(75) Inventors: Ralph Robert Jones, Westland; Tim Alan Whitehead, Dearborn; William Tumbull, Ypsilanti, all of MI (US)

(73) Assignee: Visteon Global Tech., Inc., Dearborn, MI (US)

( * ) Notice: Subject to any disclaimer, the term of this patent is extended or adjusted under 35 U.S.C. 154(b) by 0 days.

(21) Appl. No.: 09/468,624

(22) Filed: Dec. 21, 1999

(51) Int. Cl.[7] .................. G01M 19/00; G01N 17/00
(52) U.S. Cl. ...................... 73/865.3; 73/865.6
(58) Field of Search .................. 73/862.391, 865.3, 73/7, 804, 865.6, 172, 663, 665, 866.4; 364/528; 177/136; 33/600

(56) References Cited

U.S. PATENT DOCUMENTS

| | | | |
|---|---|---|---|
| 3,557,471 A | | 1/1971 | Payne et al. |
| 3,753,302 A | | 8/1973 | Daniel |
| 4,729,246 A | * | 3/1988 | Melgraad et al. ........... 73/865.6 |
| 5,018,977 A | | 5/1991 | Wiley et al. |
| 5,373,749 A | * | 12/1994 | Strand et al. ............... 73/865.3 |
| 5,379,646 A | * | 1/1995 | Andrezejak et al. ........... 73/804 |
| 5,456,019 A | * | 10/1995 | Dowell et al. ................. 33/600 |
| 5,544,528 A | * | 8/1996 | Woyski et al. ................. 73/665 |
| 5,641,917 A | * | 6/1997 | Hurite et al. ............... 73/865.3 |
| 5,665,919 A | * | 9/1997 | Woyski et al. ................. 73/665 |
| 5,675,505 A | * | 10/1997 | Trimboli ...................... 364/528 |
| 5,753,834 A | * | 5/1998 | Stewart ....................... 73/865.3 |
| 5,821,415 A | * | 10/1998 | Faust et al. .................... 73/172 |
| 5,979,242 A | * | 11/1999 | Hobbs .......................... 73/663 |
| 6,009,750 A | * | 1/2000 | Murer et al. .................. 73/172 |
| 6,069,325 A | * | 5/2000 | Aoki ........................... 177/136 |
| 6,131,436 A | * | 10/2000 | O'Bannon et al. ................ 73/7 |

\* cited by examiner

Primary Examiner—Benjamin R. Fuller
Assistant Examiner—Lilybett Martir
(74) Attorney, Agent, or Firm—Visteon Global Tech. Inc

(57) ABSTRACT

A manikin that may be used for accelerated seat durability is disclosed. The manikin provides forces that simulate both the weight of a person against the butt portion of a seat and forces produced against the back portion of a seat by human movement.

20 Claims, 2 Drawing Sheets

MANIKIN ASSEMBLY AND METHOD FOR THE TESTING OF SEATS WHICH UTILIZES THE ASSEMBLY

FIELD OF INVENTION

The present invention relates to a manikin assembly and more particularly, to a manikin assembly which may be used to test a vehicle seat by simulating the forces which are normally imparted upon the seat by the bodily movements of a passenger or driver and the vibratory forces which are typically imparted upon the seat by the vehicle.

BACKGROUND OF THE INVENTION

Vehicle seats comprise a variety of movably interconnected components which are formed and/or made from a relatively wide variety of materials including plastic, leather, metal and/or foam. These components and the assemblies which interconnect with these components are subject to damage and/or destruction which is caused by repeated seat adjustment, usage, and/or vibrations produced by the vehicle as it traverses relatively rough roads. Such repeated usage, adjustment and/or vibrations which are generated from and/or by the vehicle and which are caused by the traversing of the vehicle over uneven or "rough" road surfaces, further cause these interconnecting components to become loose and to undesirably squeak and/or rattle. Such squeaks or rattles are indicative of structural degradation and may annoy the passengers and/or operator of the vehicle and undesirably increase vehicle maintenance expenses.

In order to substantially minimize and/or reduce the occurrence of such squeaks, rattles and/or degradation, a variety of seat configurations or "designs" are typically tested for potential use within a vehicle in order to develop seats which are substantially resistant to such degradation. In order to adequately test these various seats and/or seat configurations, tests and testing assemblies must be developed that simulate many years of seat usage within a relatively short period of time.

One device that is used to simulate vehicle seat usage is a manikin and/or a manikin assembly which has the general shape of an human occupant. Particularly, the manikin is stationarilly or passively placed within and/or upon a seat which is to be tested, and the seat is then made to vibrate as the manikin passively resides within the seat. As these vibrations are imparted to the manikin-containing seat, rattles, squeaks, and/or various types of structural seat degradation are noted. Although these manikins and these tests do provide some indication of the overall reliability and/or durability of the seat or seating configuration, they do not accurately represent the true nature and amount of the forces which are actually applied to or impinge upon the seat during normal or "real life" usage (e.g., those forces and/or vibrations which emanate from the driving of the vehicle upon the road and those forces and/or motions which are concomitantly applied to the seat from an individual residing within the seat).

The present invention overcomes the aforementioned drawbacks and provides a manikin and/or manikin assembly which accurately simulates the forces and vibrations that a vehicle seat is subjected to as it is actually employed within a vehicle. Further the manikin and/or manikin assembly allows the effect of these forces, occurring over the operating life of the seat, to be desirably and substantially and accurately simulated within a reasonably short amount of time.

SUMMARY OF THE INVENTION

It is a first object of the present invention to provide a manikin assembly which allows a seat to be tested in a manner which overcomes the various and previously delineated drawbacks of prior testing methodologies and/or strategies.

It is a second object of the present invention to provide a manikin assembly which allows vibrational forces and operator type motion forces to be simultaneously applied to a seat, effective to allow the seat to be selectively subjected to forces which accurately represent normal usage of a vehicle seat over a substantial period of time.

According to a first aspect of the present invention, an assembly for testing a seat which is selectively disposed upon a testing platform is provided. The assembly comprises a manikin assembly having a buttocks portion which is selectively disposed upon the seat, a torso portion which is pivotally and selectively coupled to the buttocks portion, and a first force generator which is selectively coupled to the torso portion and which selectively generates and communicates a first force to the torso portion; and a second force generator which generates a second force and which selectively communicates the second force to the platform while the first force is selectively communicated to the torso portion.

According to a second aspect of the present invention, a method for testing the durability of seats is provided. The method includes the steps of placing a manikin assembly having a torso simulating portion upon a vehicle seat; subjecting said vehicle seat to simulated road conditions; and selectively applying a force against said torso simulating portion of said manikin assembly, thereby causing said force to be applied against said torso support portion of said vehicle seat.

According to a third embodiment of the present invention, a method for testing the durability of seats is disclosed. The method includes placing a manikin assembly having a torso simulating portion upon a vehicle seat; subjecting the vehicle seat to simulated road conditions; and applying force against said torso support of said vehicle seat by placing force against the torso simulating portion of said manikin assembly.

DETAILED DESCRIPTION OF THE PREFERRED EMBODIMENT OF THE INVENTION

Figure 1:
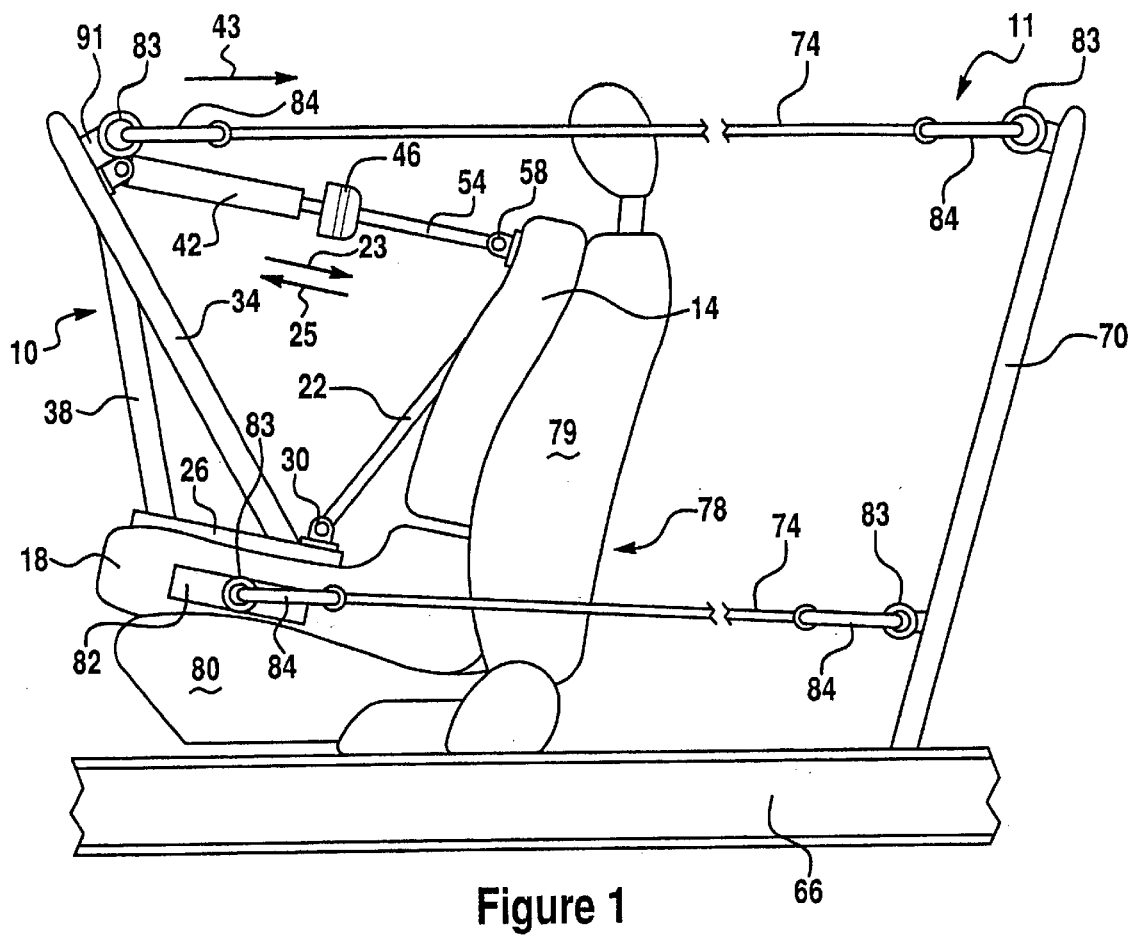
FIG. 1 illustrates a side view of a seat testing assembly which is produced and/or formed according to the teachings of the preferred embodiment of the invention.

Referring now to FIG. 1, there is shown a manikin assembly 10 which is made in accordance with the teachings of the preferred embodiment of the invention and a seat testing assembly 11 which includes and which operatively utilizes the manikin assembly 10.

As shown, manikin assembly 10 includes a generally rectangular torso simulating portion 14 and a substantially "L"-shaped buttocks simulating portion 18 which is hingedly and/or pivotally connected to the torso simulating portion in a manner which is more fully discussed below. In one non-limiting embodiment, the buttocks simulating portion 18 and the torso simulating portion 14 are selectively manufactured from cast iron or cast aluminum and cooperatively weigh about one hundred and fifty pounds. Other shapes, sizes and weights may be utilized in other non-limiting embodiments of the invention.

Figure 2:
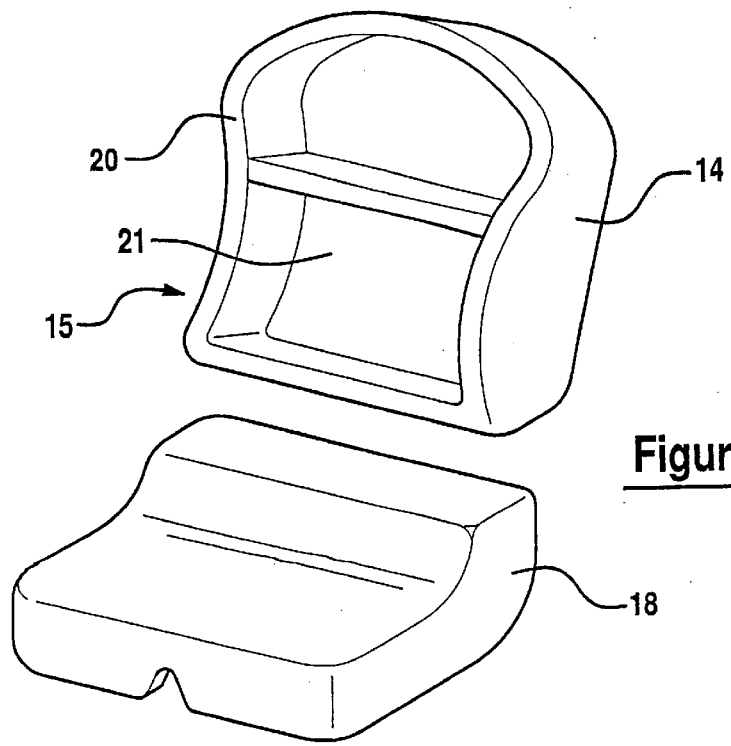
FIG. 2 illustrates a perspective unassembled view of a torso simulating portion and a buttocks simulating portion of the seat testing assembly which is shown in FIG. 1.

The torso simulating portion 14, as shown best in FIG. 2, includes a cavity 15 which forms and/or integrally terminates within an aperture or opening 20 and which terminates at or within a substantially flat surface 21. In one non-limiting embodiment, the buttocks simulating portion 18 is generally formed in the shape of a human buttocks and the torso simulating portion 14 is generally formed in the shape of a human torso. Both the torso simulating portion 14 and the buttocks simulating portion 18 may represent a conventional and a commercially available assembly and, in one non-limiting embodiment, comprise an assembly which may be purchased from the RCO Manufacturing Company.

As shown best in FIG. 1, manikin assembly 10 includes a member 22 which connects and movably couples the torso simulating portion 14 to a base member 26 which is selectively attached to and which resides upon the buttocks simulating portion 18. Particularly, the cross member 22 is connected to the base member 26 by a first pin and clevis arrangement 30 that is fastened (i.e. screwed), to the base member 26. More particularly, the cross member 22 includes a hole (not shown) that engages the pin and clevis arrangement 30 and allows the cross member 22 to selectively pivot in the direction of arrows 23, 25 such that the torso simulating portion 14 may selectively pivot in relation to the buttocks simulating portion.

The manikin assembly 10 also includes a second member 34 which is selectively attached, connected, and/or coupled to member 26 in a conventional manner (e.g. by welding). A third member 38 is selectively and conventionally attached, connected and/or coupled to the second member 34 at a first end and is attached to member 26 at a second and/or opposing end. In one non-limiting embodiment, both the second member 34 and the third member 38 are fastened, attached, connected and/or coupled to the base member 26 in a conventional manner e.g. by welding).

As further shown, a human or passenger force simulating generator 42 is attached to member 34 and a load cell 46. The load cell 46 is coupled to member 54 which is attached to the torso simulating portion 14 by use of a third pin and clevis arrangement 58. In one non-limiting embodiment, the human force simulating generator 42 comprises a pneumatic actuator with a 300 pound and 6" stroke air cylinder. In other non-limiting embodiments, other types of human force simulating generators 42 may be used. Moreover, the human force simulating generator 42 is operatively connected to the member 34, effective to allow the human force simulating generator 42 to alternately apply a force upon the torso simulating portion 14 in the general direction of arrow 43. Further, the load cell 46 and the pneumatic actuator 42 are both physically and communicatively coupled to a controller (not shown). The controller selectively adjusts the force applied by the pneumatic actuator 42 based upon information received from the load cell 46. In one non-limiting embodiment, the pneumatic actuator 42 and the load cell 46 operate with load feedback control.

Seat testing assembly 11 includes the previously delineated manikin assembly 10, a seat testing platform 66, posts 70, support members 74, and a road simulating force generator 75. Particularly, the platform 66 operatively supports a seat 78 that is desired to be tested. Typically, the seat 78 includes a torso supporting portion 79 and a buttocks supporting portion 80. Here, in one non-limiting embodiment, seat 78 is removably attached to and is disposed upon platform 66 in a manner substantially identical to the manner in which the seat 78 is attached to and disposed within a vehicle (e.g., to the floor portion of the vehicle).

Posts 70 extend upwardly from the platform 66. In the preferred embodiment of the invention, the posts are located "behind" the vehicle seat 78, as illustrated in FIG. 1. Support members 74 are selectively attached to the posts 70 and to a cross bar 91, which is selectively attached, connected and/or coupled to the second member 38 of the manikin assembly 10 in a conventional manner (e.g., by welding). In one non-limiting embodiment, the posts 70 and cross-bars 91 each include "loops" or rings 83 and each of the support members 74 include substantially "S"-shaped hook or latch members 84 which are attached in a conventional manner (e.g., by sewing) to the opposing ends of the support member 74. Similarly, support members 74 are also attached to side members 82 by use of "loops" or rings 83 and by the use of substantially "S"-shaped hook or latch members 84. The side members 82 are attached, connected or coupled in a conventional manner (e.g. by welding) to the buttocks simulating portion 18 of the manikin assembly 10. The hook members 84 can be easily, respectively, and selectively attached and detached to/from the loops or rings 83 of the cross bars 91 and the posts 70.

Figure 3:
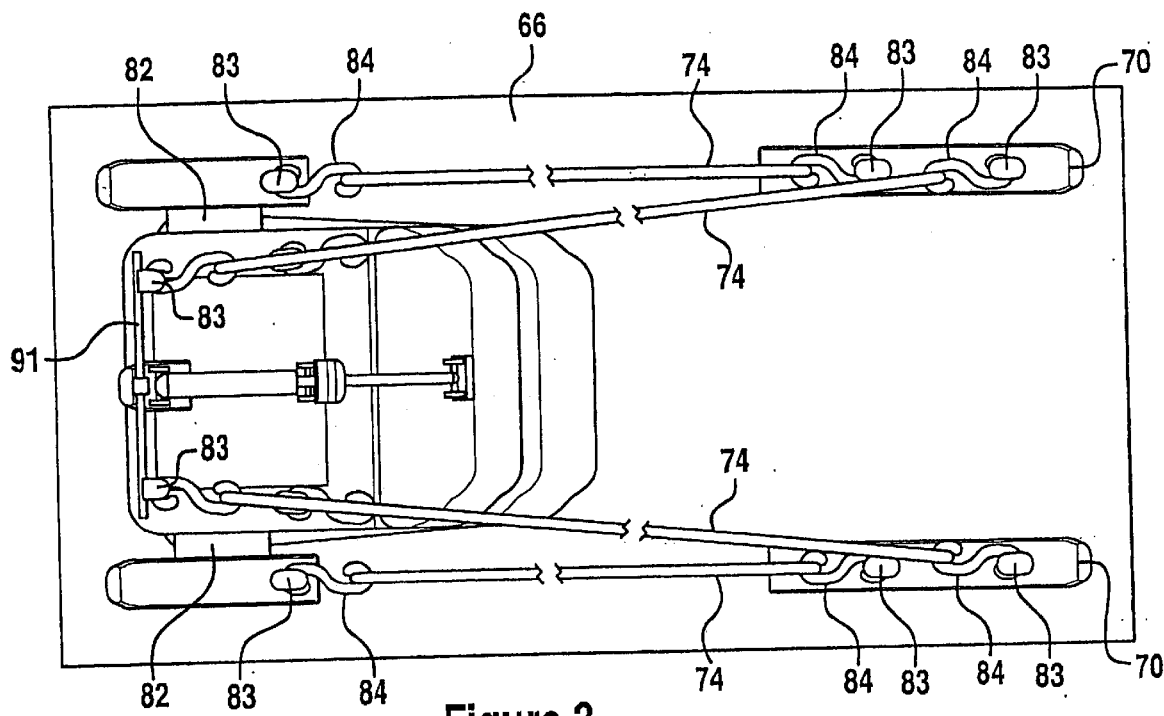
FIG. 3 illustrates a top view of the seat testing assembly of the present invention which is shown in FIG. 1.

The support members 74 cooperatively hold and/or position the manikin assembly 10 against the vehicle seat 78. Moreover, the support members 74 of the preferred embodiment of the invention are made and/or manufactured of a material that is "strong" enough to abuttingly depress the manikin assembly 10 against the vehicle seat 78, but are also "flexible" enough such that the support members 74 do not control the movements of the manikin assembly 10 which are made in response to the applied testing forces. In a non-limiting embodiment, support members 74 comprise conventional straps, cables or ropes. In the preferred embodiment of the invention, as best shown in FIG. 3, flexible straps 74 are attached to the manikin assembly 10 at certain selective locations, effective to balance the manikin assembly 10 against the vehicle seat 78. In this manner, as is more fully delineated below, the manikin assembly 10 is capable of selectively applying loads or "forces" to the vehicle seat 78 which simulate the weight and movements of a person sitting in the seat 78 as if the seat 78 were in actual use.

The manikin assembly 10 is selectively placed on the vehicle seat 78 and the supports 74 are attached to the manikin. The supports 74 are effective to substantially hold the manikin assembly 10 firmly against the back of the seat 78, but are loose enough to allow the manikin assembly 10 to bounce and/or move in a manner similar to a human occupant. The weight of the manikin assembly 10 is designed to simulate the effects of a person sitting in the automobile seat 78.

Figure 4:
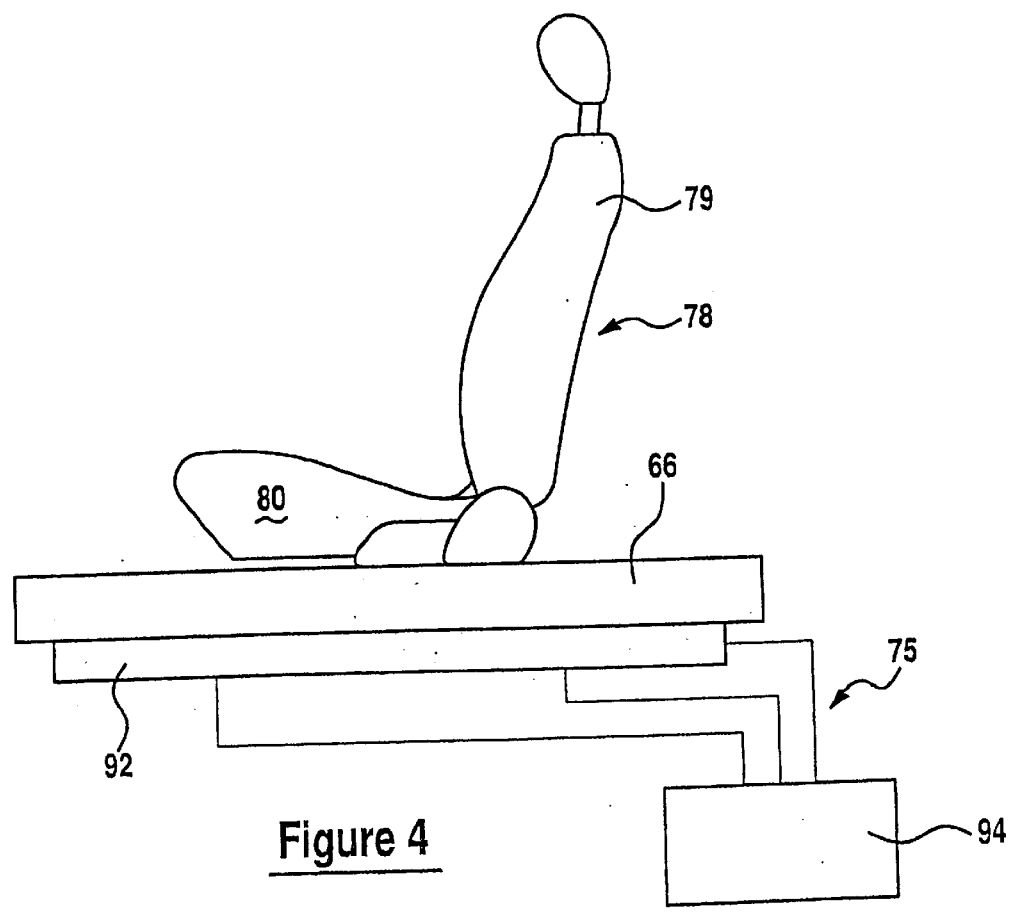
FIG. 4 illustrates a block diagram of the seat testing assembly which is shown in FIG. 1 in combination with a force generator.

Referring to FIG. 4, a seat test may be carried out on the vehicle seat 78 by attaching the platform 66 to a road simulating force generator 75. In one non-limiting embodiment, the generator 75 is a servo-hydraulic six-axis shaker table 92. In other alternate embodiments, other types of road simulating force generators may be used. As shown, the platform 66 is adapted to be mounted upon the shaker table 92 of the road simulating force generator 75. During the test, controller 94 uses a non-square iteration technique to develop shaker table drive signals that substantially reproduce the effects of vehicle accelerations in real-time at a frequency between one and fifty Hertz. These generated signals selectively cause the shaker table 92 to reproduce the vertical, lateral, longitudinal, roll, pitch and yaw motions that a vehicle typically experiences as it traverses various types of road surfaces.

The manikin assembly 10 concomitantly applies "human motion" type forces to the seat 78 as it is being selectively vibrated or moved by the shaker table 92. That is, the pneumatic actuator 42 is selectively forced against the torso support seat portion 79 of the vehicle seat 78 in a manner which is substantially similar to the force that a passenger or driver of the vehicle would place against the seat portion 79 during normal usage (e.g., the forces generated when a passenger or driver stretches, reaches for a wallet, makes seat adjustments, puts on a seat belt or performs other similar activities). Since these typical human activities and/or motions selectively place additional, and sometimes relatively large loads of force upon the torso support portion 79 of the vehicle seat 78, these forces and/or "loads" must be considered and/or "accounted for" to accurately test the durability of the vehicle seat 78.

It will be appreciated that, during such testing, the support members 74 cooperatively maintain and/or restrain the manikin assembly 10 in relatively close contact with the torso supporting portion 79 of the seat 78.

The seat testing assembly 11 of the present invention is capable of testing the resilience of a vehicle seat 78 to both road vibrations and human motions simultaneously. After subjecting a vehicle seat 78 to simulated road vibrations and human motions, test data is taken from the vehicle seat 78. Test data may include but is not limited to subjective squeak and rattle evaluations, noise testing during occupants movement of seat 78, mechanism cycling and effort measurements, objective torso support vibration measurements, H-point and torso support and head restraint chuck and deflection tests.

In addition to forces applied to vehicle seats 78, other environmental conditions can substantially effect the durability of vehicle seats 78. For example and without limitation, a vehicle used in temperate climates may be subject to extreme heat, extreme cold and differing humidity depending on the season. Thus, in alternate embodiments, seats 78 are exposed to different environmental conditions before and after testing with the manikin 10 of the present invention. In one non-limiting embodiment vehicle seats 78 are exposed to temperatures above and below comfort temperatures defined as sixty to eighty degrees Fahrenheit and above and below "comfort humidity" which is defined as twenty to eighty percent humidity. In other non-limiting embodiments, seats 78 are "environmentally soaked" before, during and/or after testing.

It should be understood that this invention is not to be limited to the exact construction or embodiment described above but that various changes may be made without departing from the spirit or scope of the invention.

What is claimed is:

1. An assembly for testing a seat which is selectively disposed upon a testing platform, said assembly comprising:
    a manikin assembly having a buttocks portion which is selectively disposed upon the seat, a torso portion which is pivotally coupled to said buttocks portion and a first force generator which is coupled to said torso portion and which selectively generates and communicates force to said torso portion; and
    a second force generator which generates a vibratory force on the testing platform and which communicates said vibratory force to the platform as said force is communicated to said torso portion, to stimulate forces imparted on said seat by normal use in a vehicle.

2. A seat testing assembly as in claim 1 wherein said first force generator is a pneumatic actuator.

3. A seat testing assembly as in claim 2 wherein a load cell is connected to said pneumatic actuator and both said load cell and said pneumatic actuator are communicatively coupled to a controller which adjusts said first force based upon data gathered from said load cell.

4. A seat testing assembly as in claim 3, wherein said pneumatic actuator and said load cell operate with load feedback control.

5. A seat testing assembly as in claim 1 wherein a plurality of supports are connected to said manikin assembly for holding the manikin assembly against said seat.

6. A seat testing assembly as in claim 1, wherein said buttocks portion, said torso portion and said first force generator are substantially supported by said vehicle seat.

7. A seat testing assembly as in claim 1, wherein said first force generator generates said first force in only one direction relative to itself.

8. A manikin assembly for testing a seat having a buttocks support portion and a torso support portion, said manikin assembly comprising:
    a buttocks simulating portion which is selectively disposed upon said buttocks support portion of said seat;
    a torso simulating portion which is pivotally connected to said buttocks simulating portion; and
    a road stimulating force generator or an actuator which selectively and operatively rests upon and places a force upon said buttocks simulating portion and said torso simulating portion that stimulates forces of a human body resting upon said seat under vehicle operating conditions.

9. A manikin assembly as in claim 8, wherein said force generator is a pneumatic actuator.

10. A manikin assembly as in claim 9, wherein a load cell is connected to said pneumatic actuator and both said load cell and said pneumatic actuator are communicatively coupled to a controller which adjusts said force based upon data gathered from said load cell.

11. A manikin assembly as in claim 10, wherein said pneumatic actuator and said load cell operate with load feedback control.

12. A manikin assembly as in claim 8, wherein said supports are connected to said manikin assembly for holding said manikin assembly against a vehicle seat.

13. A manikin assembly as in claim 8, wherein said buttocks simulating portion, said torso simulating portion and said human force simulating generator can all be substantially supported by a vehicle seat that is being tested.

14. A manikin assembly as in claim 8, wherein said force generator only delivers a force in one direction relative to itself.

15. A method for testing durability of vehicle seats comprising:
    placing a manikin assembly having a torso simulating portion upon a vehicle seat; providing a support for said vehicle seat;
    subjecting said support with a force that simulates road conditions; and
    selectively applying a force against said torso simulating portion of said manikin assembly, wherein said force applied to said support and said force applied to said manikin assembly determine the durability of said vehicle seats.

16. A method as in claim 15 wherein said step of subjecting said vehicle seat to simulated road conditions is carried out using a hydraulic road simulating force generator.

17. A method as in claim 16 further comprising securing said manikin assembly against said vehicle seat using support members that extend behind said vehicle seat.

18. A method as in claim 15 further comprising environmentally soaking said vehicle seat prior to placing said manikin on said vehicle seat.

19. A method as in claim 18 wherein said environmentally soaking takes place below sixty degrees Fahrenheit.

20. A method as in claim 18 wherein said environmentally soaking takes place above eighty degrees Fahrenheit.

* * * * *